US012697991B2

(12) United States Patent
Just

(10) Patent No.: US 12,697,991 B2
(45) Date of Patent: Aug. 4, 2026

(54) PREDICTIVE VEHICLE OPERATING ASSISTANCE

(71) Applicant: Timothy Just, Victorville, CA (US)

(72) Inventor: Timothy Just, Victorville, CA (US)

(*) Notice: Subject to any disclaimer, the term of this patent is extended or adjusted under 35 U.S.C. 154(b) by 105 days.

(21) Appl. No.: 18/930,254

(22) Filed: Oct. 29, 2024

(65) Prior Publication Data

US 2025/0050901 A1     Feb. 13, 2025

Related U.S. Application Data

(63) Continuation of application No. 18/362,305, filed on Jul. 31, 2023, now abandoned, which is a
(Continued)

(51) Int. Cl.
*B60W 50/14*         (2020.01)
*H04W 4/02*          (2018.01)
(Continued)

(52) U.S. Cl.
CPC ............ *B60W 50/14* (2013.01); *H04W 4/023* (2013.01); *H04W 4/40* (2018.02); *H04W 4/90* (2018.02);
(Continued)

(58) Field of Classification Search
CPC .................................................. B60W 50/14
See application file for complete search history.

(56) References Cited

U.S. PATENT DOCUMENTS 5,350,035 A * 9/1994 Bodier .................... B60B 39/10
                                                           291/1
5,532,678 A    7/1996 Kin et al.
                (Continued)

FOREIGN PATENT DOCUMENTS

DE    102016100614 A1    7/2017
JP        H06313749 A    11/1994
                (Continued)

OTHER PUBLICATIONS

"An Internet of Tires? Pirelli Marries 5G and Automobile Wheels". (Nov. 27, 2019). Retrieved Sep. 22, 2020, from https://spectrum. IEEE.org/cars-that-think/transportation/sensors/an-internet-of-tires-pirelli-marries-5g-and-automobile-wheels.
(Continued)

*Primary Examiner* — Michael A Berns
(74) *Attorney, Agent, or Firm* — Kwan & Olynick LLP

(57)                ABSTRACT
Described herein are various systems and processes for predictive operating assistance of vehicles. The systems and techniques described herein may be applicable to vehicles such as vehicles operated by a driver, semi-autonomous vehicles, and/or autonomous vehicles. The assistance techniques described herein may be predictive. That is, the techniques allow for the prediction of non-optimal or dangerous operating conditions before the vehicle control is compromised. Accordingly, a warning may be provided and/or operation of the vehicle may be changed based on the predictive assistance determinations. In certain embodiments, the techniques described herein may provide warnings to a driver, may detect faults within the vehicle, may aid in route planning, may detect obstacles proximate to the vehicle, and/or may aid in the operation of the vehicle.

20 Claims, 10 Drawing Sheets

Related U.S. Application Data continuation of application No. 17/373,442, filed on Jul. 12, 2021, now abandoned, which is a continuation-in-part of application No. 16/865,963, filed on May 4, 2020, now Pat. No. 11,080,949.

(51) Int. Cl.
*H04W 4/40* (2018.01)
*H04W 4/90* (2018.01)

(52) U.S. Cl.
CPC . *B60W 2050/143* (2013.01); *B60W 2050/146* (2013.01); *B60W 2554/4029* (2020.02); *B60W 2556/50* (2020.02)

(56) References Cited

U.S. PATENT DOCUMENTS

| | | | |
|---|---|---|---|
| 5,723,768 | A | 3/1998 | Ammon |
| 6,856,882 | B2 | 2/2005 | Raab |
| 7,032,436 | B2 | 4/2006 | Yokota et al. |
| 7,694,556 | B2 | 4/2010 | Spetler |
| 7,832,262 | B2 | 11/2010 | Spetler |
| 8,493,200 | B2 | 7/2013 | Wakao et al. |
| 9,043,112 | B2 | 5/2015 | Brusarosco et al. |
| 9,296,263 | B2 | 3/2016 | Muthukumar |
| 9,466,157 | B2 | 10/2016 | Kourtev et al. |
| 9,493,145 | B2 | 11/2016 | Mehr et al. |
| 9,767,516 | B1 | 9/2017 | Konrardy et al. |
| 10,114,106 | B2 | 10/2018 | Schiffmann et al. |
| 10,169,999 | B2 | 1/2019 | Pandurangarao |
| 10,202,204 | B1 | 2/2019 | Daidzic |
| 10,392,016 | B2 | 8/2019 | Gorczowski |
| 10,414,405 | B2 | 9/2019 | Duvernier et al. |
| 10,520,305 | B2 | 12/2019 | Leone et al. |
| 10,520,317 | B2 * | 12/2019 | Maliszewski .......... G01B 21/26 |
| 10,549,734 | B2 | 2/2020 | Hofmann et al. |
| 10,679,436 | B2 | 6/2020 | Javid et al. |
| 10,889,152 | B2 | 1/2021 | Kilaru et al. |
| 11,014,555 | B1 | 5/2021 | Beauchamp et al. |
| 11,055,934 | B1 | 7/2021 | Just |
| 11,080,949 | B1 | 8/2021 | Just |
| 11,488,480 | B1 | 11/2022 | Balasubramanian et al. |
| 11,614,740 | B2 | 3/2023 | Zhang |
| 11,890,987 | B2 | 2/2024 | Englander et al. |
| 2009/0102636 | A1 * | 4/2009 | Tranchina .......... B60C 23/0408 340/447 |
| 2013/0035836 | A1 | 2/2013 | Mehr et al. |
| 2015/0005982 | A1 | 1/2015 | Muthukumar |
| 2015/0153266 | A1 | 6/2015 | Mack |
| 2015/0203107 | A1 | 7/2015 | Lippman |
| 2019/0071086 | A1 | 3/2019 | Gorczowski |
| 2020/0041304 | A1 | 2/2020 | Arreaza et al. |
| 2020/0164695 | A1 | 5/2020 | Kilaru et al. |
| 2020/0379474 | A1 | 12/2020 | Zhang |
| 2021/0287546 | A1 | 9/2021 | Englander et al. |
| 2021/0339763 | A1 | 11/2021 | Just |
| 2023/0373514 | A1 | 11/2023 | Just |
| 2025/0050901 | A1 * | 2/2025 | Just ........................ H04W 4/40 |
| 2026/0001558 | A1 * | 1/2026 | Labella ................... B60T 8/172 |

FOREIGN PATENT DOCUMENTS

| | | | |
|---|---|---|---|
| JP | 2010032269 | A | 2/2010 |
| WO | 2021225865 | A1 | 11/2021 |

OTHER PUBLICATIONS

U.S. Appl. No. 17/004,925, Examiner Interview Summary Record (PTOL-413), Nov. 23, 2020, 1 pg.

U.S. Appl. No. 17/004,925, Non-Final Rejection, Nov. 23, 2020, 23 pgs.

U.S. Appl. No. 17/373,442, USPTO e-Office Action: CTNF—Non-Final Rejection, Jan. 31, 2023, 16 pages.

U.S. Appl. No. 18/362,305, USPTO e-Office Action: CTNF—Non-Final Rejection, Mar. 26, 2024, 7 pages.

U.S. Appl. No. 16/865,963, Examiner Interview Summary mailed Mar. 15, 2021, 2 pgs.

U.S. Appl. No. 16/865,963, Examiner Interview Summary mailed, Dec. 22, 2020, 1 pg.

U.S. Appl. No. 16/865,963, Notice of Allowance mailed Mar. 30, 2021, 5 pgs.

U.S. Appl. No. 16/865,963, Office Action mailed Dec. 22, 2020, 15 pgs.

U.S. Appl. No. 17/004,925, Examiner Interview Summary mailed, Feb. 8, 2021, 3 pgs.

U.S. Appl. No. 17/004,925, Notice of Allowance mailed Mar. 10, 2021, 5 pgs.

Blackwell, K. (Apr. 30, 2018). Continental Unveils New Assistance Concepts for Early Risk Detection of Hydroplaning. Retrieved Sep. 22, 2020, from https://www.continental.com/en-us/press-/press-releases/continental-unveils-new-assistance-concepts-for-early-risk-detection-of-hydroplaning--129096.

Blandina, G., & Fassio, D. (Sep. 27, 2020). An Active Safety System Able to Counter Aquaplaning, Integrated With Sensorized Tires, ADAS, and 5G Technology for Both Human-Driven and Autonomous Vehicles. Retrieved Sep. 22, 2020, from https://www.sae.org/publications/technical-papers/content/2020-24-0019/.

Chan, K. (Jun. 4, 2017). New tech combats hydroplaning to smooth your Sunday drive. Retrieved Sep. 22, 2020, from https://www.scmp.com/magazines/style/tech-design/article/2096674/new-hi-tech-system-combats-hydroplaning-smooth-your.

Gary, W. (May 9, 2018). Driver Assist Tech Tackles Hydroplaning Next. Retrieved Sep. 22, 2020, from https://www.kbb.com/car-news/driver-assist-tech-tackles-hydroplaning-next/.

Hartmann, B., Kloster, A., Kretschmann, D., & Raste, D. (n.d.). Hydroplaning Avoidance—A Holistic System Approach. Retrieved Sep. 22, 2020, from https://www-esv.nhtsa.dot.gov/Proceedings/26/26ESV-000256.pdf.

Hydroplaning Speed and Infrastructure Characteristics, Proc. I MechE vol. 224 Part J: J. Engineering Tribology, 201 0 (Year: 201 0).

International Application Serial No. PCT/US21/29946, Search Report and Written opinion mailed Jul. 28, 2021, 12 pgs.

Int'l Application Serial No. PCT/US21/29946, IPRP mailed 11/17/228 pgs.

NASA, Hazards of Tire Hydroplaning to Aircraft Operations, 1963 (Year: 1963).

Pace Awards—HELLA. (Oct. 22, 2018). Retrieved Sep. 22, 2020, from https://www.autonews.com/awards/2018-finalist-hella-road-condition-analysis-sensor.

Sorokanich, B. (Jul. 28, 2020). New Porsche 911 Uses Microphones to Save You From Hydroplaning. Retrieved Sep. 22, 2020, from https://www.roadandtrack.com/new-cars/car-technology/a25748346/2020-porsche-911-wet-mode/.

* cited by examiner

LEGEND
108 = Tire Pressure Sensor
110 = Wheel Sensor
112 = GPS Sensor
116 = Communications Module
120 = Satellite
124 = Electronic Device
128 = Vehicle Sensor
132 = Vehicle Output Module

LEGEND

108 = Tire Pressure Sensor
110 = Wheel Sensor
112 = GPS Sensor
116 = Communications Module
128 = Vehicle Sensor
132 = Vehicle Output Module

PREDICTIVE VEHICLE OPERATING ASSISTANCE

PRIORITY DATA

This patent document is a continuation of and claims the benefit of priority under 35 U.S.C. § 120 of U.S. patent application Ser. No. 18/362,305, titled "PREDICTIVE VEHICLE OPERATING ASSISTANCE", by Timothy Just, filed Jul. 31, 2023, which is a continuation of and claims the benefit of priority under 35 U.S.C. § 120 of U.S. patent application Ser. No. 17/373,442, titled "PREDICTIVE VEHICLE OPERATING ASSISTANCE", by Timothy Just, filed Jul. 12, 2021, which is a continuation-in-part of and claims the benefit of priority under 35 U.S.C. § 120 of U.S. patent application Ser. No. 16/865,963 (now U.S. Pat. No. 11,080,949 patented Aug. 3, 2021), titled "PREDICTIVE VEHICLE OPERATING ASSISTANCE", by Timothy Just, filed May 4, 2020, all of which are hereby incorporated herein by reference in their entirety for all purposes.

TECHNICAL FIELD

The present disclosure generally relates to vehicle operation assistance. More specifically, the present disclosure relates to techniques for assisted operation of vehicles such as semi-autonomous and autonomous vehicles.

BACKGROUND

Conventional vehicle piloting aids are reactive. That is, various sensors determine a current operational condition of the vehicle. If the current operational condition of the vehicle indicates that the vehicle is out of control (e.g., various sensor readings indicate a slippage of a tire), remedial measures are then employed to bring the vehicle back under control. Thus, such piloting aids are reactive in nature.

SUMMARY

Provided are various mechanisms and processes for predictive vehicle assistance. The systems and techniques described herein may be applicable to vehicles such as vehicles operated by a driver, semi-autonomous vehicles, and/or autonomous vehicles. Thus, the systems and techniques described herein may aid in a driver's operation of a vehicle and/or aid in the operation of an autonomous vehicle.

Among various embodiments described herein is a vehicle. The vehicle includes a body, an interior disposed within the body and including a user interface, a communications module, a vehicle output module, and a controller, communicatively coupled to the user interface, the communications module, and the vehicle output module. The controller is configured to receive, via the communications module, communications data from an electronic device associated with a pedestrian, determine that the communications data is received from the electronic device associated with the pedestrian, determine a presence of the pedestrian proximate to the vehicle, and output a pedestrian alert with the user interface.

Also described is a further vehicle. The vehicle includes a body, an interior disposed within the body and including a user interface, a global positioning system (GPS) sensor, a communications module, a vehicle output module, and a controller, communicatively coupled to the user interface, the communications module, the GPS sensor, and the vehicle output module. The controller is configured to receive, via the GPS sensor, GPS data, determine, based on the GPS data, a location of the vehicle, communicate, via the communications module, location data to a server, the location data is configured to allow the server to determine electronic devices that are proximate to the vehicle, receive, via the communication module, data indicating a presence of a pedestrian proximate to the vehicle, determine the presence of the pedestrian proximate to the vehicle, and output a pedestrian alert with the user interface.

Also described is a non-transitory machine readable medium. The non-transitory machine readable medium is configured to cause a vehicle controller to perform operations that include receiving, via a communications module of the vehicle, communications data from an electronic device associated with a pedestrian, determining that the communications data is received from the electronic device associated with the pedestrian, determining a presence of the pedestrian proximate to the vehicle, and outputting a pedestrian alert with a user interface of the vehicle.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods and computer program products described herein. These drawings in no way limit any changes in form and detail that may be made by one skilled in the art without departing from the spirit and scope of the disclosed implementations.

DETAILED DESCRIPTION OF PARTICULAR EMBODIMENTS

This disclosure describes techniques, methods, systems, apparatus, and computer program products that may be used for vehicle operating assistance. In certain embodiments, the assistance techniques may be predictive. That is, the techniques allow for the prediction of non-optimal or dangerous operating conditions before the vehicle control is compromised (e.g., the vehicle is out of control). Accordingly, a warning may be provided and/or operation of the vehicle may be changed based on the predictive assistance determinations.

The systems and techniques described herein may be applicable to vehicles such as vehicles operated by a driver, semi-autonomous vehicles, and/or autonomous vehicles. Thus, the systems and techniques described herein may aid in a driver's operation of a vehicle and/or aid in the operation of a computer controlled vehicle. In certain embodiments, the techniques described herein may provide warnings to a driver, may detect faults within the vehicle, may aid in route planning, may detect obstacles proximate to the vehicle, and/or may aid in the operation of the vehicle. Variously, the systems and techniques described herein may allow for vehicle operations to be adjusted before dangerous situations are encountered.

Figure 1:
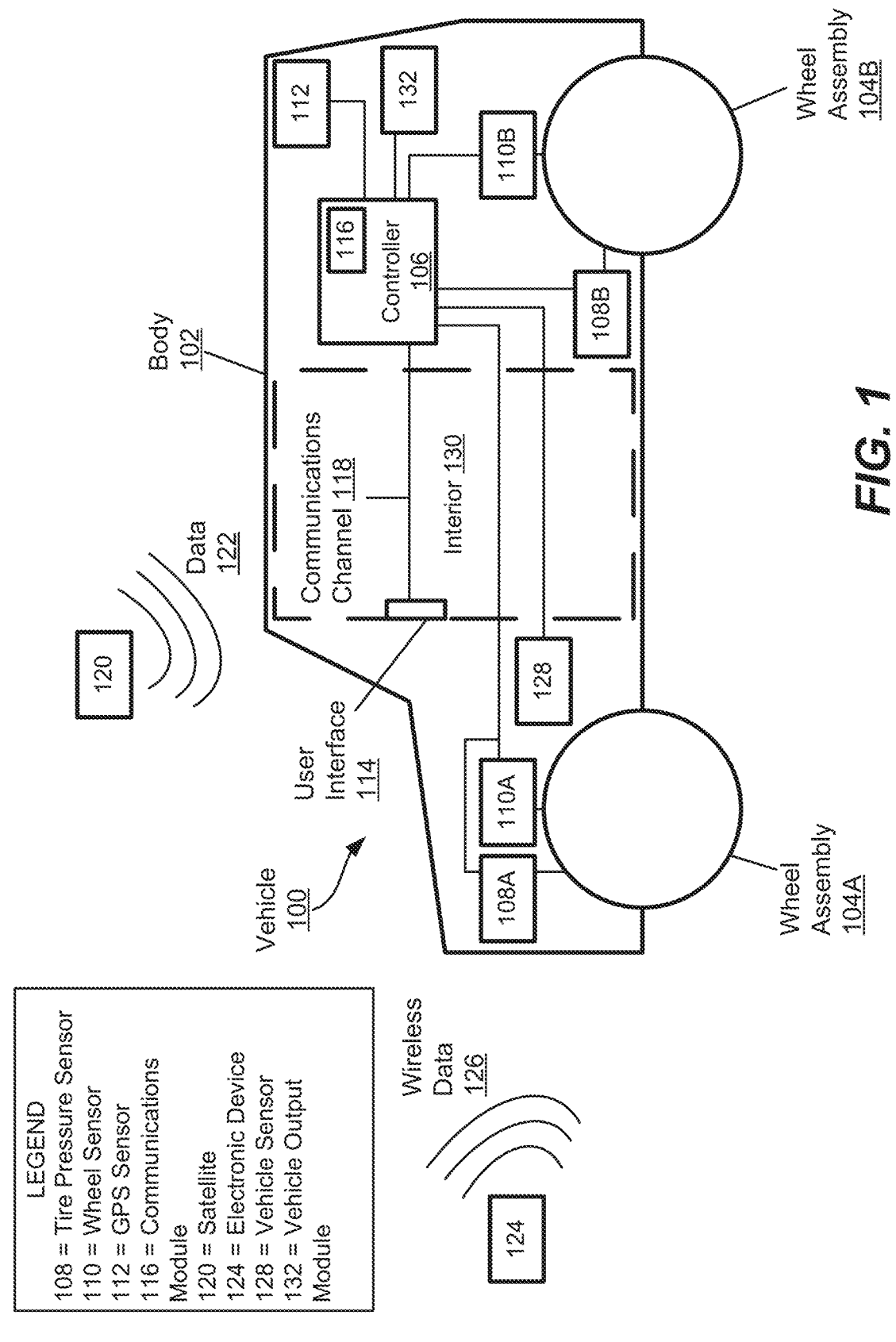
FIG. 1 illustrates a representation of a vehicle with predictive operating assistance, in accordance with one or more embodiments.

FIG. 1 illustrates a representation of a vehicle with predictive operating assistance, in accordance with one or more embodiments. FIG. 1 illustrates a vehicle 100. Vehicle 100 includes body 102 and wheel assemblies 104A and 104B. Body 102 includes interior 130 disposed within body 102. Interior 130 may be configured to receive one or more operators (e.g., drivers), passengers, cargo, and/or other items. Interior 130 may include one or more user interfaces, such as user interface 114. User interface 114 may communicate information to occupants of interior 130. In various embodiments, vehicle 100 may also communicate information by, for example, wirelessly transmitting the information to an electronic device (e.g., a mobile device) through various communications techniques (e.g., Wi-Fi and/or Bluetooth®) and/or providing the information through a user interface on an exterior of the vehicle.

Vehicle 100 includes controller 106. Controller 106 may include one or more memories and one or more single or multi-core processors. The memories include one or more storage media. Such storage may include either or both volatile or nonvolatile storage media and can provide non-transitory storage for computer readable instructions, data structures, program modules and other data for the operation of the scanning apparatus. The processors may be configured to execute instructions stored within the memories. Such instructions may include the techniques described herein.

Each of wheel assemblies 104A and 104B includes a wheel and a tire. Tire pressures within the tire of wheel assemblies 104A and 104B may be sensed by tire pressure sensors 108A and 108B, respectively. Tire pressure sensors 108A and 108B may provide tire pressure data to controller 106. In various embodiments, tire pressure sensors 108A and 108B may wirelessly provide tire pressure data to controller 106.

Wheel assemblies 104A and 104B may provide control for vehicle 100. Thus, wheel assemblies 104A and/or 104B may provide acceleration, deceleration, and/or steering control for vehicle 100. Characteristics of wheel assemblies 104A and 104B may be sensed by wheel sensors 110A and 110B, respectively. Wheel sensors 110A and 110B may include, in certain embodiments, wheel slip sensors, wheel speed sensors, steering angle sensors, tire temperature sensors, and/or other sensors configured to allow for determination of various operating conditions of vehicle 100. Wheel sensors 110A and 110B, as well as other components of vehicle 100, may communicate via wired or wireless communications channel 118 with controller 106. Such wired and/or wireless communications channel 118 may provide data through various data formats (e.g., CANBUS).

Vehicle 100 may further include vehicle sensor 128. Vehicle sensor 128 may be configured to sense one or more aspects of the behavior of the vehicle. Vehicle sensor 128 may include, for example, a yaw sensor, a steering wheel sensor, a brake pedal position sensor, a throttle position sensor, a rainfall sensor, and/or other such sensors configured to determine an attitude of vehicle 100 and/or operating inputs from an operator of vehicle 100. In other embodiments, vehicle sensor 128 may include sensors configured to determine the area around vehicle 100, such as radar, lidar, camera systems, and/or other such sensors that are configured to determine persons, animals, and/or other objects that are proximate to vehicle 100 (e.g., within a certain distance from vehicle 100). Data from vehicle sensor 128 may be communicated through communications channel 118 (e.g., to controller 106).

Controller 106 may receive such data from vehicle sensor 128 and determine the presence of objects that are nearby vehicle 100. Based on the determination, controller 106 may provide one or more outputs. For example, controller 106 may cause vehicle output module 132 to provide one or more outputs. Vehicle output module 132 may provide a visual, audio, vibrational, and/or other output that may provide communications with other persons and/or vehicles proximate to vehicle 100. Thus, for example, vehicle output module 132 may include lights, speakers, and/or other such components that may warn a person that vehicle 100 is nearby. For example, in certain embodiments, certain vehicle powertrains, such as electric motors, may not generate the sound that pedestrians are used to expecting from a vehicle. Vehicle output module 132 may thus provide a visual, audio, and/or vibrational warning to such pedestrians that vehicle 100 is within the vicinity, increasing the safety of operating vehicle 100 within such pedestrians.

Additionally or alternatively, controller 106 may provide one or more outputs to electronic device 124 via wireless data 126. Controller 106 may communicate with one or more applications of electronic device 124. Such data from controller 106 may cause electronic device 124 to provide feedback to the user of electronic device 124 that vehicle 100 is within proximity of electronic device 124. Such feedback may be via, for example, a vibration of electronic device 124, a sound or audible message generated by electronic device 124 or communicated to a headset associated with electronic device 124, a message displayed on electronic device 124, and/or another such technique that allows electronic device 124 to communicate to the user that vehicle 100 is within proximity (e.g., within a threshold distance such as 10 feet, 20 feet, 50 feet, 100 feet, and/or another such distance) of electronic device 124.

Vehicle 100 further includes global positioning system (GPS) sensor 112. GPS sensor 112 may be configured to receive positioning data from one or more satellites, such as satellite 120. Satellite 120 may wirelessly provide data 122 that may include positioning data to GPS sensor 112. Positioning data may indicate a global and/or local position of vehicle 100. Thus, positioning data may indicate where vehicle 100 is located. Positioning data may further include data directed to road networks, road conditions, weather conditions, and other such conditions. Thus, positioning data may allow for controller 106 to determine a route for vehicle 100 to travel on. The route may include road and/or weather conditions. Warnings may be output and/or operation of vehicle 100 may be adjusted based on the conditions of the route.

Communications module 116 may also be included with vehicle 100. Communications module 116 of vehicle 100 may be a separate module and/or may be integrated within controller 106. Communications module 116 may be configured to wirelessly communicate with a plurality of other devices through various different wireless communications formats (e.g., Wi-Fi, Bluetooth®, 4G, 5G, and other data connections). Communications module 116 may communicate with various electronic devices such as devices proximate to vehicle 100 (e.g., within visual sight) as well as devices disposed at longer distances away from vehicle 100.

Such devices may include, for example, electronic device 124. Electronic device 124 may, in certain embodiments, be a mobile device. Electronic device 124 may be carried by a pedestrian, cyclist, worker, or other party. The party may be proximate to vehicle 100 (e.g., on a sidewalk, along a street, in a parking lot, or in another area proximate to vehicle 100). Electronic device 124 may communicate with communications module 116 through wireless data 126.

Electronic device 124 may, in certain embodiments, include one or more applications. Such application(s) may be configured to communicate with controller 106 through wireless data 126. The application(s) may indicate to controller 106 that the user of the mobile device is a pedestrian, cyclist, or another party. Controller 106 may then identify, from the data communicated by electronic device 124, that the user of the mobile device is a pedestrian, cyclist, or another party.

In other embodiments, controller 106 may determine that communications module 116 detects the presence of the mobile device (e.g., via passive emissions from the mobile device and/or from hotspots or other electronic data transmissions). In certain such embodiments, controller 106 may determine that data received from an electronic device is a mobile device and, thus, more likely to be a pedestrian or cyclist, based on identification information. As such, for example, data communicated by the mobile device may identify that it is a mobile device or may identify the make and model of the device. From such data, controller 106 may determine that electronic device 124 is a mobile device and, accordingly, determine that electronic device 124 is possessed by a pedestrian, cyclist, or other such party. In such an embodiment, affirmative confirmation that the user is a pedestrian, cyclist, or other party is not required. Instead, controller 106 may assume that the user is a pedestrian, cyclist, or other party if electronic device 124 is determined to be a mobile device. Upon such a determination that the user is a pedestrian, cyclist, or other party, a warning may then accordingly be output to an operator of vehicle 100 (e.g., via user interface 114) or operation of vehicle 100 may be adjusted by controller 106 according to the detected presence of the pedestrian, cyclist, or another party.

Figure 2:
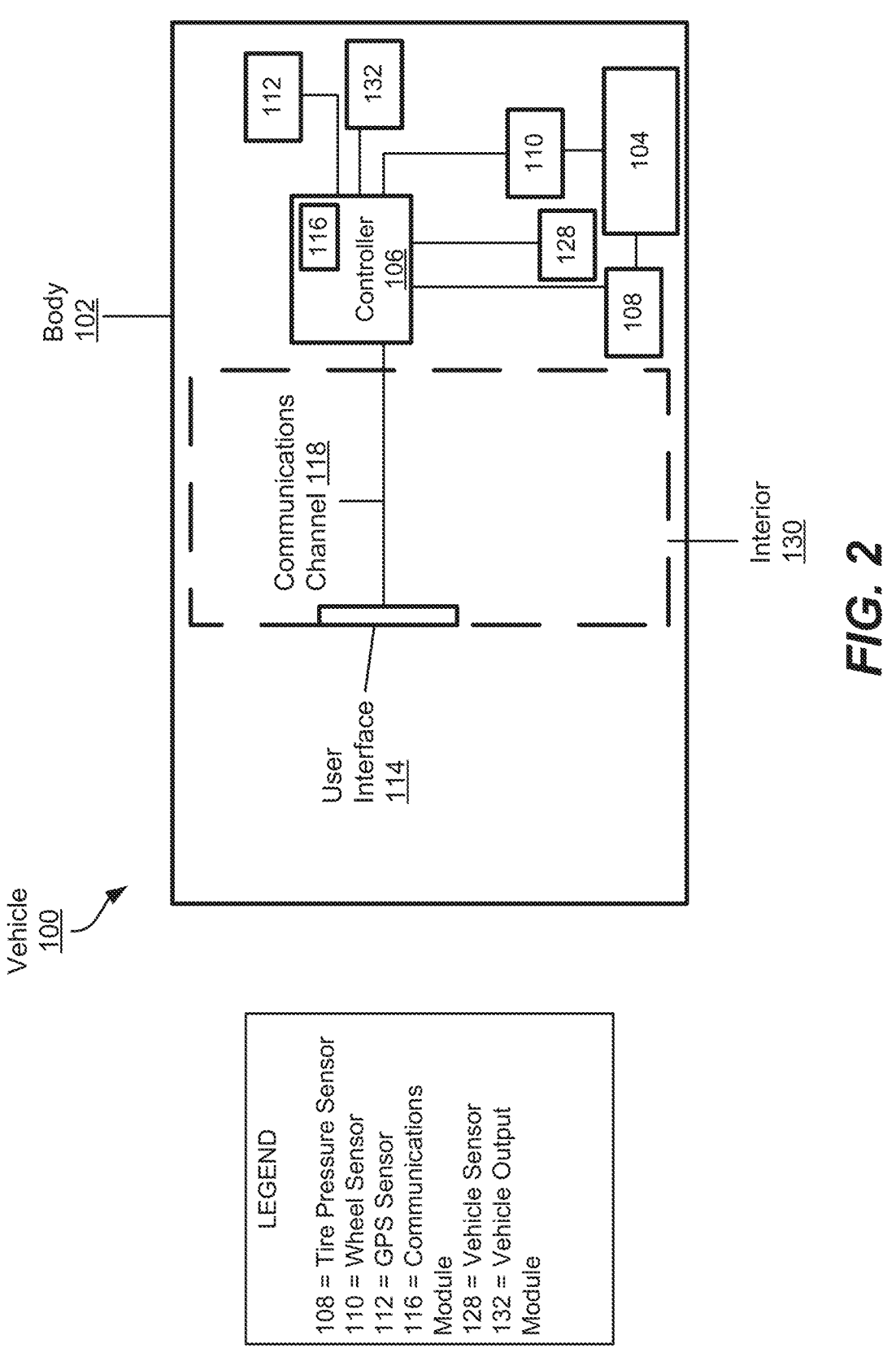
FIG. 2 illustrates a block diagram of a vehicle with predictive operating assistance, in accordance with one or more embodiments.

FIG. 2 illustrates a block diagram of a vehicle with predictive operating assistance, in accordance with one or more embodiments. FIG. 2 illustrates a block diagram of vehicle 100 shown in FIG. 1. As such, vehicle 100 of FIG. 2 includes body 102 with interior 130 that includes user interface 114. Vehicle 100 further includes wheel assembly 104 with tire pressure sensor 108 and wheel sensor 110. Vehicle 100 further includes vehicle sensor 128, GPS sensor, communications module 116, and controller 106. Data may be communicated between various components of vehicle 100 via communications channel 118. As shown in FIG. 2, in various embodiments, vehicle 100 may include one or more wheels. In vehicles with a plurality of wheels, the sensors and other components described herein may apply to one or more of the wheels.

Figure 3:
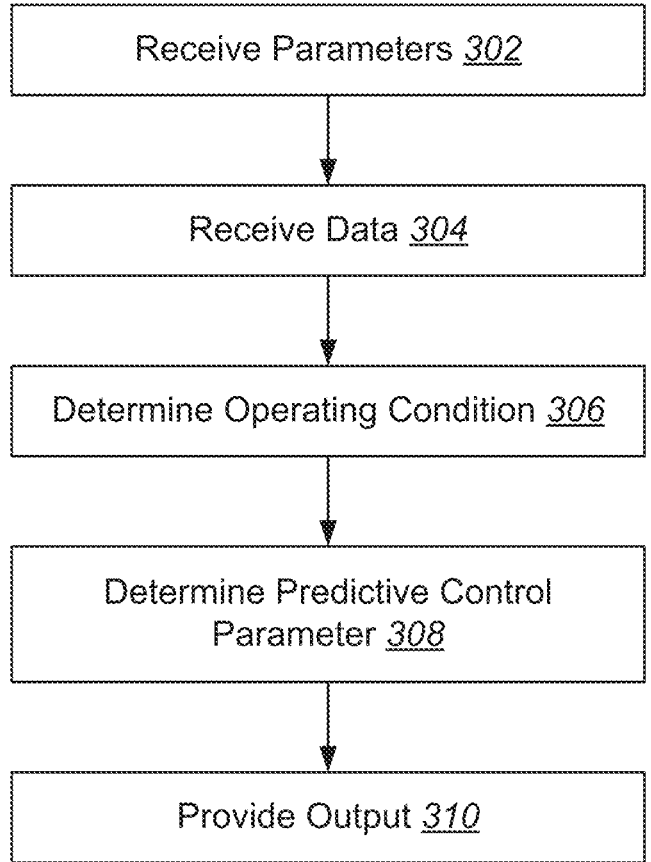
FIG. 3 illustrates a flow process for predictive operating assistance of a vehicle, in accordance with one or more embodiments.

FIG. 3 illustrates a flow process for predictive operating assistance of a vehicle, in accordance with one or more embodiments. In block 302, operational parameters may be received. Such operational parameters may include, for example, information related to aspects of the vehicle, such as properties of the tires of the vehicle on wet pavement, fuel efficiency characteristics of the vehicle, dynamic characteristics of the vehicle, rotational characteristics of the wheel assembly relative to tire pressure (e.g., how many rotations a wheel assembly will cover for a given distance based on a detected amount of tire pressure), and/or other such characteristics. In various embodiments, the operational parameters may be an assumed factor or may be based on testing (e.g., tires may be tested and the parameters may be based on test results for their wet weather performance). The vehicle may include parameters for a plurality of different aspects, as described in the techniques disclosed herein.

In block 304, the controller may receive data from one or more sensors of the vehicle. Such sensors may include the sensors described herein and/or other sensors configured to determine one or more aspects of the vehicle. The data from the sensors may be communicated through one or more wired or wireless communications channels. In certain embodiments, examples of sensor data that may be received by the controller includes vehicle speed data, tire pressure data, yaw data, wheel rotation data, steering wheel angle data, throttle position data, brake pedal position data, wheel slip data, weather data, route data, and other such data.

An operating condition of the vehicle may be determined in block 306. The operating condition may be determined, at least in part, from the data received in block 304. Operating conditions may be any conditions described herein, such as whether a road surface is wet (e.g., from weather data or rainfall sensor), any obstacles to a planned route, the number of rotations of the wheel assembly, and/or any other aspect.

In block 308, a predictive control parameter is determined for the vehicle. The predictive control parameter may include, for example, a parameter that the operating condition of the vehicle may be compared against, a target time, a baseline operating condition (e.g., how many rotations of the wheel per mile determined from GPS data), and other parameters.

In block 310, an output is determined. The output may be, for example, a visual and/or audio output to be provided by a user interface (e.g., a warning), an adjustment to commands associated with operation of the vehicle, an adjustment to a determined route, or other such outputs. Variously, the output may be provided to an operator of the vehicle, may adjust current operation of the vehicle itself, may adjust future operation of the vehicle, or may be provided to a third party (e.g., a party responsible for maintenance of the vehicle).

Figure 4:
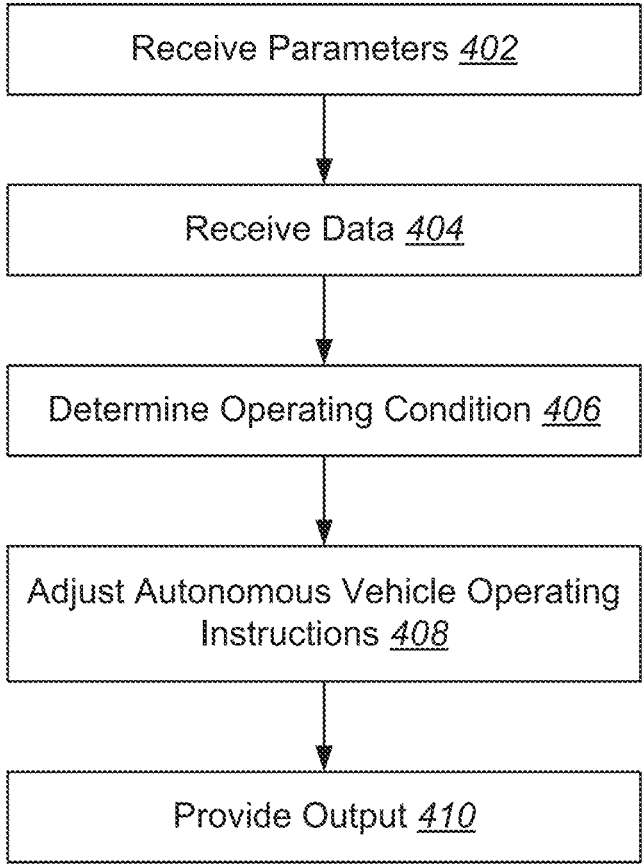
FIG. 4 illustrates a flow process for predictive autonomous vehicle operation, in accordance with one or more embodiments.

FIG. 4 illustrates a flow process for predictive autonomous vehicle operation, in accordance with one or more embodiments. In block 402, parameters are received. In certain embodiments, such parameters may include, for example, efficiency data for the vehicle (e.g., efficiency at various speeds for the vehicle, or an efficiency curve related to speed), handling dynamics and thresholds of the vehicle (e.g., acceleration, braking, and/or cornering grip limits) in one or more weather conditions (e.g., dry, mist, wet, and other conditions), outer dimensions of the vehicle, and/or other parameters. In various embodiments, the parameters may, generally, be directed to any parameter related to operation of the vehicle.

In block 404, data is received from one or more devices and/or sensors of the vehicle. The data may be that described herein. Based on the data, the operating condition of the vehicle may be determined in block 406. Thus, for example, vehicle speed, planned route, proximate persons and obstacles, maintenance condition, and/or other aspects of operation of the vehicle may be determined in block 406.

In block 406, operating conditions may be determined. Operating conditions may be determined from one or more devices and/or sensors of the vehicle. Operating conditions may include current road conditions, weather conditions, traffic conditions, vehicle operating conditions, and/or data from other parties.

Based on the data and/or the operating conditions, operating instructions for the autonomous vehicle may be adjusted in block 408. Operating instruction adjustments may be determined by, for example, determining that the vehicle is operating at a speed inappropriate for conditions (e.g., weather conditions) and adjusting the speed of the vehicle, determining that conditions of the vehicle has changed (e.g., changed from factory specifications) and adjusting how the vehicle is operated, determining that route conditions have changed from what was forecasted and changing route instructions (e.g., changing the route, changing speeds along portions of the route, and/or other changes), and/or determining other changes to the operating instructions of the vehicle.

In block 410, an output is provided. The output may include changes to the operating instructions of the vehicle, but may also include communications (e.g., visual or audio) provided to an occupant of the vehicle or within the vehicle for observation by another party, data transmitted to an associated electronic device, and/or another such output.

Figure 5:
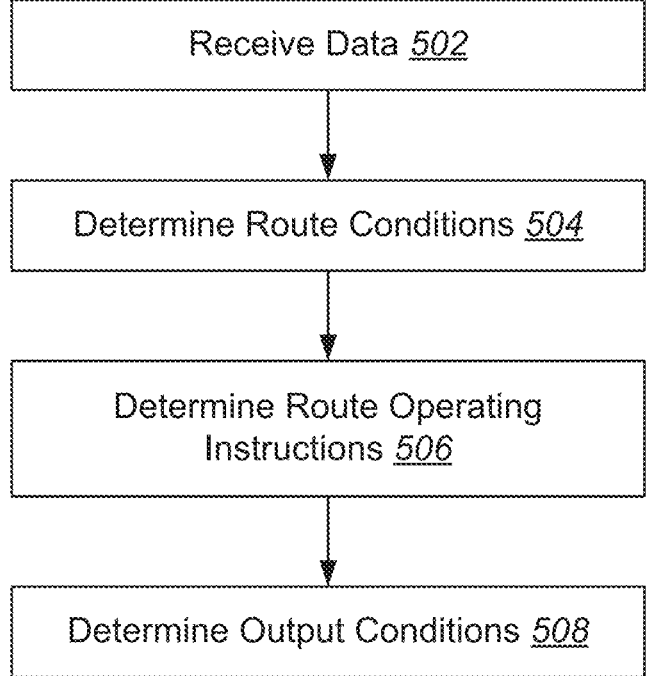
FIG. 5 illustrates a flow process for predictive autonomous vehicle route planning, in accordance with one or more embodiments.

FIG. 5 illustrates a flow process for predictive autonomous vehicle route planning, in accordance with one or more embodiments. In block 502, data is received as described herein. Data may include route data such as a destination, route conditions, traffic conditions, road closures, and other data related to the planning of routes for an autonomous vehicle. The data may also include parameters for planning of the route (e.g., any route preferences such as avoiding tolls or highways, any vehicle restrictions, and preferences such as fastest route or shortest route).

In block 504, based on the data, route conditions are determined. Thus, a route may be determined (e.g., based on preferences contained within the data received in block 502). Route planning may be based on route and weather conditions, vehicle conditions, vehicle restrictions, and/or other data stored or received. The route may be optimized based on real time data received, such as current weather conditions.

In block 506, route operating instructions may be determined based on the data and the route conditions. The route operating instructions may include, for example, the route (e.g., which streets and highways to travel on), the operating speed of the vehicle along various portions of the route, the sensors that should be active on various portions of the route and the configurations of the sensors (e.g., which direction to point at, which of a plurality of possible modes the sensors should be operated at), whether warnings should be output, and other such instructions.

For example, in a certain embodiments, the controller of the vehicle may determine a route from the data and route conditions received in blocks 502 and 504. The route may be determined based on determining that the route is the fastest possible route, the shortest possible route, the safest possible route (e.g., the route with the least amount of obstacles and/or adverse weather conditions), or another type of route. In certain embodiments, the route may be, for example, a short distance route or a long distance (e.g., cross country) route. Thus, for example, cross-country automated trucks may utilize the disclosures described herein to plan a cross-country delivery route.

The determined route may include a plurality of sections. Each of the plurality of sections may include separate operating instructions. Thus, an example route may include five sections and each of the sections may include different target speeds. Thus, in the first section, because it is determined to be a highway and the weather is clear, the vehicle is instructed to operate at 100% of the speed limit. In the second section, rain is determined to be present. Thus, the vehicle is instructed to be operated 25% below its hydroplaning speed (determined as described here) or the speed limit, whichever is lower.

In the third section, the temperature is determined to be below freezing, but the weather is determined to have been clear for over a week. Based on the weather being clear, the risk of snow and ice on the road is determined to be minimal. As such, the vehicle is instructed to be operated at the speed limit. However, due to the increased risk of possible ice, a stability system of the vehicle is set at a more conservative setting (e.g., more likely to intervene at lower amounts of slip). Furthermore, any multi-mode external facing cameras of the vehicle may be set to an infrared mode (instead of a visual mode). The infrared mode may allow for detection of portions of the road more likely to be iced over (e.g., if the surface temperature is lower) and vehicle speed may be reduced over those sections. In another example, a visual camera may be more sensitive to reflective surfaces on the roadway. Reflections may be more likely to be determined to be ice. If the controller determines that ice is likely to be on the road surface, the operating speed of the vehicle may be reduced and the braking and/or turning points of the vehicle may be adjusted. As such, for examples where the vehicle is autonomous, the braking and turning points may be adjusted to avoid any potential ice spots to increase control of the vehicle.

In the fourth section, the temperature is below freezing and precipitation is determined to be falling. As such, the controller may determine that there is a high likelihood of slippery conditions. Thus, the vehicle may be operated at reduced speeds at slippery surface traction control settings.

In the fifth section, the weather is determined to be clear and warm. However, traffic conditions are determined to be heavy and/or the fifth section is determined to be in an urban area. As such, the vehicle is at a setting for more aggressive pedestrian detection. Thus, the controller may further slow the vehicle if there is a possible obstacle detected on the side of the road. Cameras of the vehicle may also be oriented to more likely detect pedestrians and cyclist (e.g., oriented at a height appropriate for pedestrians and cyclist, such as between 2-4 feet of height). The communications module of the vehicle may also be more sensitive to detecting wireless data from electronic devices disposed proximate the vehicle to better detect data communicated by pedestrians and cyclists and detect them as such.

Figure 6:
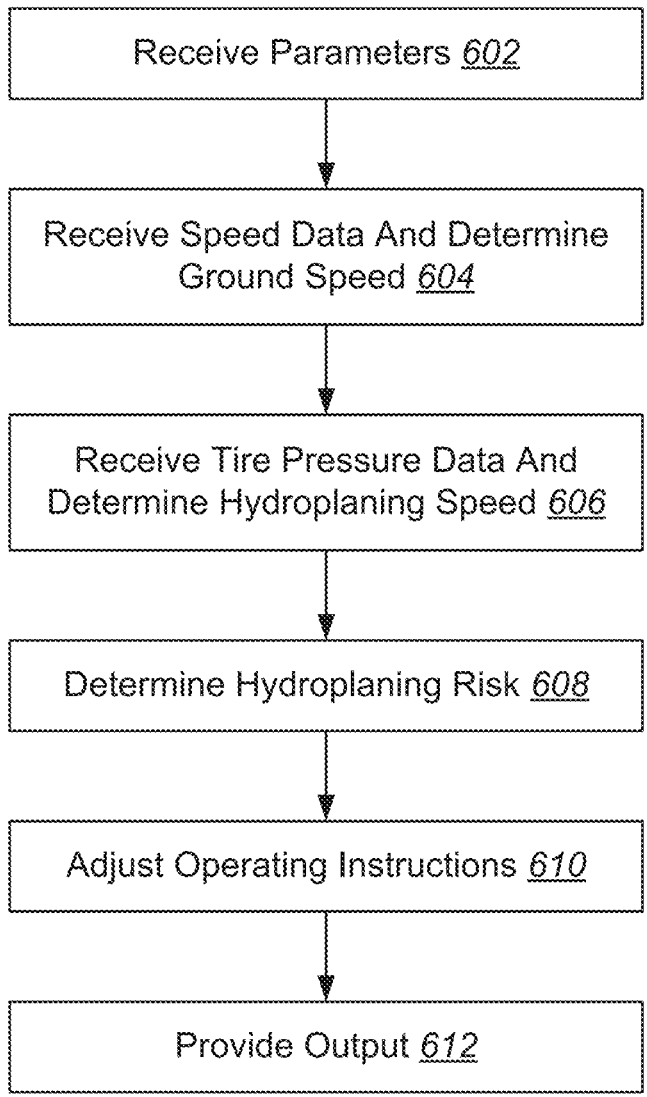
FIG. 6 illustrates a flow process for predictive hydroplaning assistance, in accordance with one or more embodiments.

FIG. 6 illustrates a flow process for predictive hydroplaning assistance, in accordance with one or more embodiments. FIG. 6 illustrates a technique for proactively determining when a vehicle is operating in a condition where there is a risk of hydroplaning greater than a threshold risk.

In block 602, parameters are received as described herein. The parameters may be described herein and may include parameters associated with performance of the vehicle, such as performance in wet conditions. Thus, for example, the wet performance of the tire of the vehicle as a function of tire pressure may be provided. In certain embodiments, the parameters may be determined from, for example, independent testing (e.g., performance characteristics of the tires may be tested). In certain embodiments, the vehicle may include the parameters of the original equipment items, such as tires. In certain such embodiments, if items are changed during the lifetime of the vehicle, the parameters may also be changed (e.g., manually entered or automatically changed as part of the service process through a computer application that determines what changes are being performed on the vehicle). Thus, parameters for replacement parts such as replacement tires may be provided to the vehicle when servicing the vehicle. In embodiments where a parameter is not provided, baseline values may be assumed. Thus, for example, a baseline hydroplaning value of 9, or another baseline value, may be provided in situations where no tire data is provided.

In block 604, speed data of the vehicle may be received. The speed data may be data received from one or more speed sensors, GPS sensors, or other sensors of the vehicle. The speed data allows for the determination of a current ground speed of the vehicle.

In block 606, the tire pressure data may be received. The tire pressure data may include the current tire pressure of the vehicle. In various situations, the tire pressure of the vehicle may change while the vehicle is operated (e.g., due to changes in temperature, in operation of the vehicle, slow punctures, and other considerations). Thus, the tire pressure data may be current data or may be recently updated data.

Based on the tire pressure data, a hydroplaning speed of the tires of the wheel assembly may be determined. The hydroplaning speed may be a speed at which the tire is determined to have a chance of hydroplaning greater than a threshold chance. The hydroplaning speed may be a calculation based on the tire pressure of the tire of the wheel assembly. The hydroplaning speed may be calculated by, for example, multiplying the current tire pressure by a constant. Thus, for example, the tire pressure, in pounds per square inch, may be multiplied by a constant parameter received in block 602 to determine the hydroplaning speed, in miles per hour, of the tire.

In certain embodiments, determination of the hydroplaning speed may be based on a determined wetness of the road surface. Thus, for example, one or more sensors, such as visual cameras, of the vehicle may detect a wetness level of the road or rainfall sensors may determine the intensity of rainfall to determine a wetness level. In such an embodiment, the parameter may be a scale that is based on the wetness level. The determined wetness level may result in the selection of a proper parameter for determination of the hydroplaning speed. In such an embodiment, the parameter may result in a lower determined hydroplaning speed if wetness levels are determined to be higher (e.g., the parameter may be a numerical parameter and may decrease in value based on increasing wetness levels).

In certain additional embodiments, the parameter used for determining the hydroplaning speed may also be based on detected tire wear. Thus, tire wear of the vehicle may be determined (e.g., as described herein) and the parameter may be based on the detected wear. The parameters may include, for a range of different tire pressures, different parameter values for use in calculating the hydroplaning speed based on different tire pressure values. As such, higher amounts of tire wear may result in utilizing a parameter that is lower in magnitude than a parameter associated with lower amounts of tire wear. Thus, the hydroplaning speed of tires with higher amounts of wear may be determined to be less than the hydroplaning speed of tires with lower amounts of wear.

As such, the hydroplaning speed may be calculated based on a parameter reflecting the characteristics of the tires and the tire pressure data. In various embodiments, determining the hydroplaning speed and comparing the hydroplaning speed to the current speed of the vehicle may allow for proactive determination of hydroplaning risk, as in block 608. Thus, in block 608, the hydroplaning speed is compared to the ground speed to determine hydroplaning risk. The ground speed may be determined to be a percentage of the hydroplaning speed (e.g., 50%, 100%, 150%).

Based on the hydroplaning risk determined in block 608, operating instructions for the vehicle may be adjusted in block 610. Adjustments may include, for example, changing an operating speed of the vehicle (e.g., slowing down based on determining that the speed is within a threshold percentage of the hydroplaning speed or over the hydroplaning speed), changing braking and steering threshold of the vehicle (e.g., the speed versus steering angle of the vehicle to limit the amount of lateral g-forces that the vehicle can generate in a corner), and/or other operating instructions of the vehicle. In certain embodiments, the speed of the vehicle may be adjusted to a certain percentage of the hydroplaning speed (e.g., between 50 to 100% of the hydroplaning speed). In certain embodiments, the adjustment may include a warning (e.g., requesting that the operator slow down the vehicle or that the vehicle is at risk of hydroplaning) to be provided to the operator of the vehicle.

The adjustments may be output in block 612. As such, any warnings may be displayed or given by the user interface of the vehicle. Any changes to operation of the vehicle may also be performed (e.g., slowing down an autonomously operated vehicle). Thus, the techniques described herein allow for out of control situations to be determined as likely to happen before they happen, and for operation of the vehicle to be adjusted accordingly to avoid such out of control situations. Thus, safe operation of the vehicle may be performed proactively instead of reactively, as in typical techniques.

Figure 7:
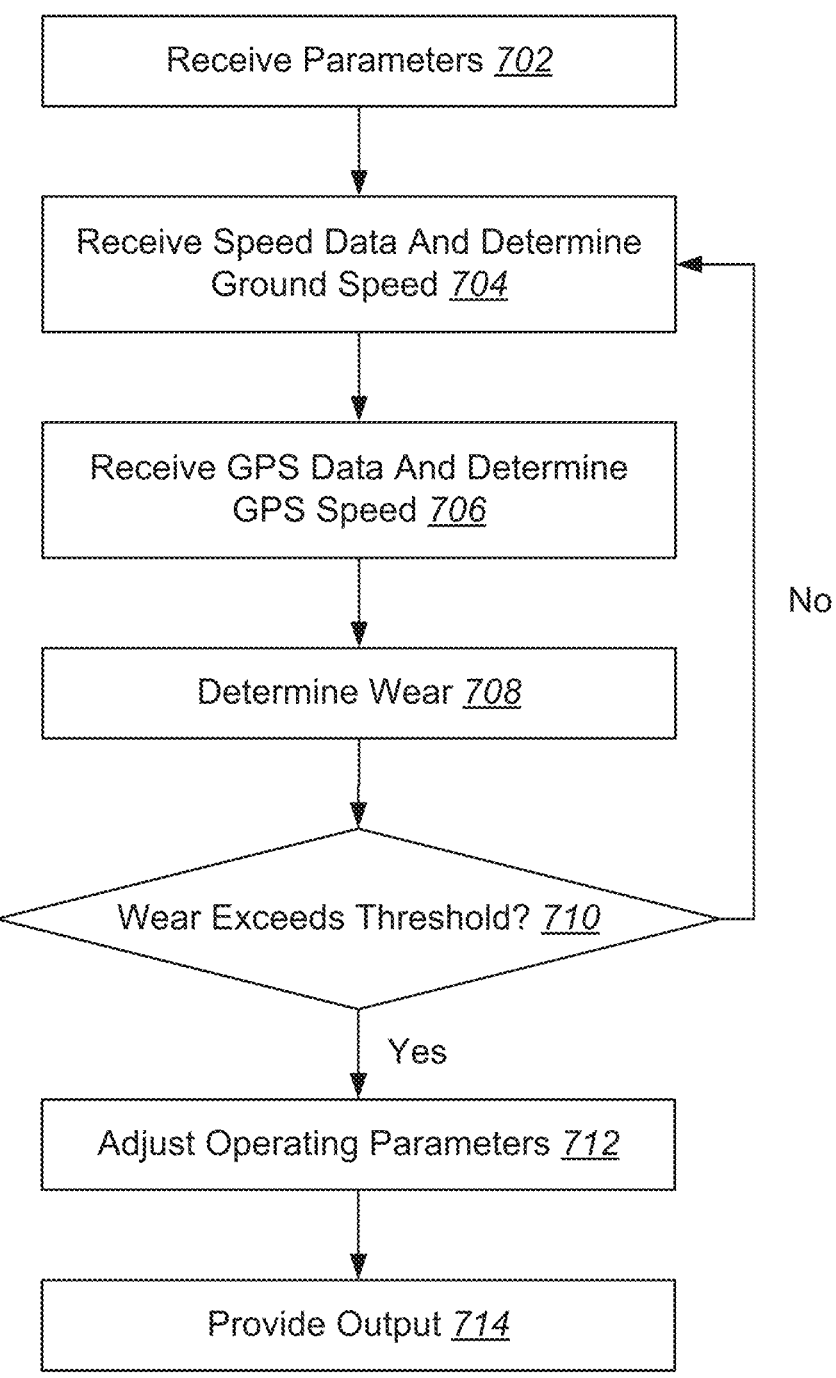
FIG. 7 illustrates a flow process for tire wear prediction, in accordance with one or more embodiments.

FIG. 7 illustrates a flow process for tire wear prediction, in accordance with one or more embodiments. The technique of FIG. 7, as well as any other technique described herein, may be combined with the technique of FIG. 6 and other techniques. Thus, for example, the tire wear of the vehicle may be determined in FIG. 7 and the parameters used to determine the hydroplaning speed may be accordingly adjusted based on the tire wear.

In block 702, parameters may be received, as described herein. The parameters may include the number of rotations of the wheel assembly per unit distance (e.g., per kilometer or mile) relative to the tire pressure of the tire. The parameter may indicate different amounts of rotation based on tire wear. For example, as a tire wears down, the number of rotations to roll for a given distance will increase. The parameters may reflect that increase.

In block 704, speed sensor data from the vehicle may be received. The sensor data may indicate the amount of rotations per unit of time of the wheel assembly. Such rotations per unit time is typically used for determining the ground speed of the vehicle, but, in the technique described herein, is used to determine the wear of the tire. As a tire wears, while the vehicle may determine that the ground speed for a given number of rotations per unit time is unchanged as the number of rotations per unit time is unchanged, the ground speed actually decreases due to the smaller diameter.

In block 706, GPS data may be received. The GPS data may indicate a satellite determined speed of the vehicle. Based on the GPS readings, a true ground speed of the vehicle may be determined. Such a true ground speed is determined without being affected by tire wear.

In block 708, wear of the tire may be determined. The wear may be determined by comparing the determined speed to the actual GPS speed. Based on that comparison, a percentage error may be determined. The amount of wear of the tire may then be determined by the percentage error. Thus, for example, the parameters may indicate that the vehicle is equipped with 30 inch diameter tires. The comparison may determine a percentage error of 1% between determined and GPS speed. Based on the 1% error, it may be determined that the tire has 0.15 inches of wear, leading to a 0.3 inch smaller diameter tire.

In another embodiment, the GPS speed may be determined and the number of rotations per unit time may be determined from the sensor readings of the vehicle. Based on the GPS speed, the distance per unit time traveled is then determined. The number of rotations per unit time is also determined from the sensor readings. The diameter of the tire is then determined by determining the tire diameter required to cover that distance for the number of rotations per unit time. The determined diameter may be compared to a nominal tire diameter and the wear may be determined based on the difference of the comparison.

In various embodiments, the parameters may also incorporate the current tire pressure of the tire. As tires may deform at different rates at different pressures, the wear may take into account the current tire pressure of the vehicle when determining the amount of wear of the tire.

In block 710, a comparison may be made as to whether the wear amount exceeds a threshold wear amount (e.g., 0.05%, 0.1%, 0.15% or another percentage or value of the new tire diameter, or a fixed amount or percentage of wear since the last adjustment). If the wear amount does not exceed the threshold, the technique may return to block 704. If the wear amount does exceed the threshold, the technique may continue to block 712. In certain embodiments, block 710 may be skipped and the determined wear of the tire may be automatically used to adjust operational parameters in block 712.

In block 712, the operating parameters of the vehicle may be adjusted. Thus, for example, the parameter used to determine the hydroplaning speed may be adjusted if the tire has been determined to have worn. As such, for example, based on the determined wear of the tire, a different set of parameters may be selected that may, for example, result in a lower hydroplaning speed to compensate for the lower amount of tread on the tire. Furthermore, if the wear is past a tire replacement level, a warning or other communications may be determined.

In block 714, the adjustment is output. Thus, operation of the vehicle may be adjusted based on the tire. Such operations may include the parameters used to determine the hydroplaning speed of the vehicle, but may also include other operations. For example, if wear is past a performance threshold, the vehicle may be adjusted to operate at a lower maximum deceleration or lateral g-force due to decreased tire grip, to prevent tire skidding in such situations. Additionally, if tire replacement is required, a warning message may be output on the user interface of the vehicle or data may be communicated to various electronic devices (such as the mobile device of the operator or an electronic device of a maintenance entity) to indicate that replacement of the tires is required.

Figure 8:
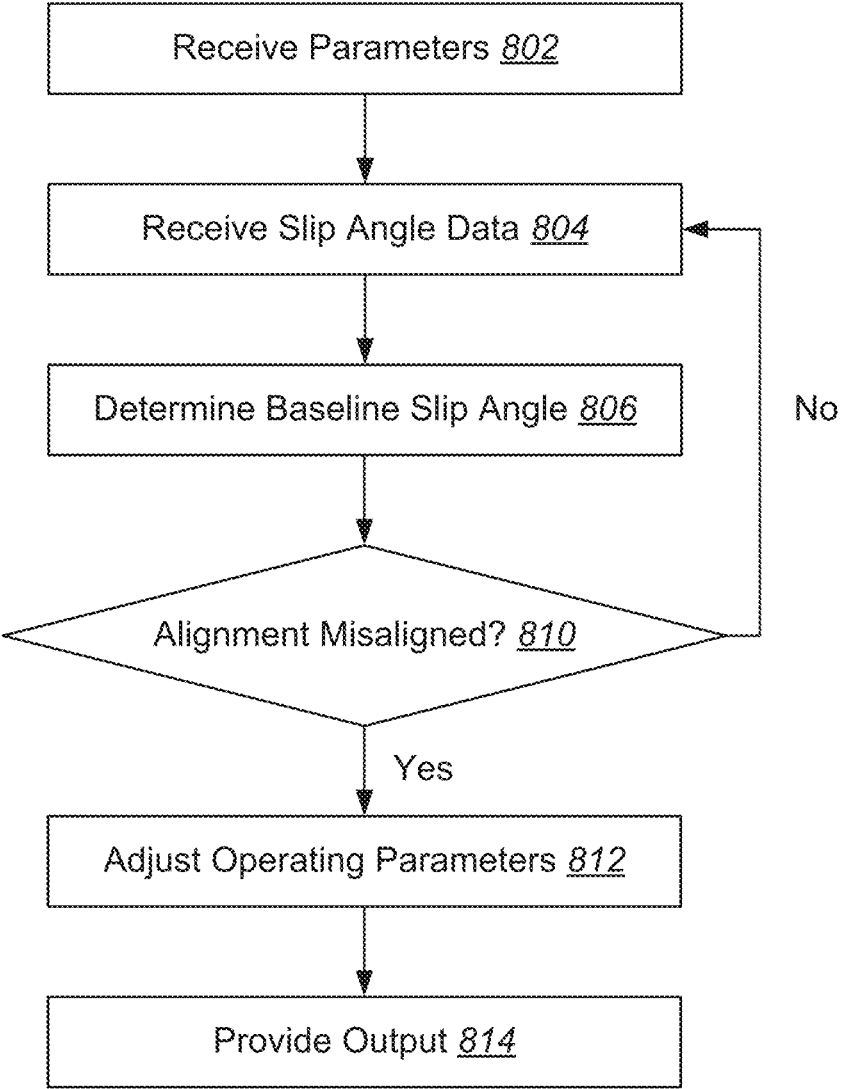
FIG. 8 illustrates a flow process for predictive alignment determination, in accordance with one or more embodiments.

FIG. 8 illustrates a flow process for predictive alignment determination, in accordance with one or more embodiments. The technique of FIG. 8 may be utilized by vehicles to determine when an alignment of the vehicle needs adjusting. The techniques described herein may be appropriate for autonomous vehicles as autonomous vehicles are not operated by a driver. In an operator driven vehicle, the operator may receive feedback from the steering wheel, pedals, and other controls. Based on the feel, the operator may determine problems with the vehicle. Thus, for example, steering feedback or vehicle handling may change due to misaligned alignment. However, in an autonomous vehicle, the operator does not operate the controls and, thus, does not have the opportunity to obtain feedback from the controls. The technique of FIG. 8 may detect problems with the vehicle in lieu of feel based problem diagnosis of the vehicle by the operator.

In block 802, parameters may be received as described herein. The parameters may include baseline operating parameters such as the baseline alignment specifications of the vehicle, baseline operating specifications such as the slip experienced by each tire, the normal rolling resistance of the vehicle, and other such parameters.

In block 804, slip angle data may be received. The slip angle data may be data indicating the slip angle experienced by various wheel assemblies when the vehicle is commanded to be operated in a straight line. Thus, the slip angle data received in block 804 may be data received during certain operating conditions such as when the vehicle is determined to be on relatively even ground (e.g., with crown of less than 5 degrees) and being commanded to operate in a straight line. The slip angle data may be determined by various sensors such as wheel slip sensors. The wheel slip sensors may be, for example, optical sensors that allows for a determination of a direction of travel of the vehicle relative to the direction of the tire. The wheel assembly and vehicle may include various features to aid in the determination of the slip angle, such as markings or forms (e.g., reflective strips on the inside barrel of the wheel may allow for a determination of the angle of direction that the wheel is pointed towards).

In block 806, the slip angle of one or more tires of the wheel assemblies are determined from the slip angle data. The slip angle may be determined relative to the direction of travel of the vehicle body. For example, when the vehicle is determined to be traveling in a straight line, the angle of one or more tires relative to the vehicle body may be determined from the slip angle data. In a certain embodiment, the slip angle may be determined for a given control condition, such as when the vehicle is traveling in a straight line. In another embodiment, the angle of a tire relative to the vehicle body may be compared to the angle of one or more other tires relative to the vehicle body. Such relative angles may also allow for a determination of the current alignment angle of the vehicle.

In block 808, a determination is made as to whether the alignment of the vehicle is misaligned or not. In certain embodiments, the slip angle determined in block 806 is used to determine the current alignment of the vehicle. As the slip angle indicates the current orientation of each wheel assembly, the toe angle of each wheel assembly may correspond or be based on the slip angle. The current alignment is then compared to a baseline alignment. If one or more wheel assemblies deviate from the baseline alignment by an amount greater than a threshold amount, the alignment may be determined to be misaligned and the technique may proceed to block 810. Otherwise, the technique may return to block 804.

In block 810, the operating parameters of the vehicle may be adjusted based on the determination that the alignment is misaligned. For example, the default steering angle for operating the vehicle in a straight line may be changed. In certain embodiments, the vehicle may include a plurality of different motors. Thus, for example, a plurality of wheels of the vehicle may each include different electric motors. In such embodiments, the torque output by the motors may be adjusted to compensate for the misalignment and continue to orient the vehicle in a straight line.

In block 812, the operational adjustments may be performed. Furthermore, a warning or message may be output. The warning or message may indicate that the vehicle's alignment is misaligned. The warning or message may be visually or audibly output by the user interface or may be communicated to an electronic device. Thus, for example, the vehicle may wirelessly communicate with an electronic device (e.g., that of the vehicle's operator or that of an organization responsible for maintaining the vehicle) that the alignment of the vehicle should be adjusted.

Figure 9:
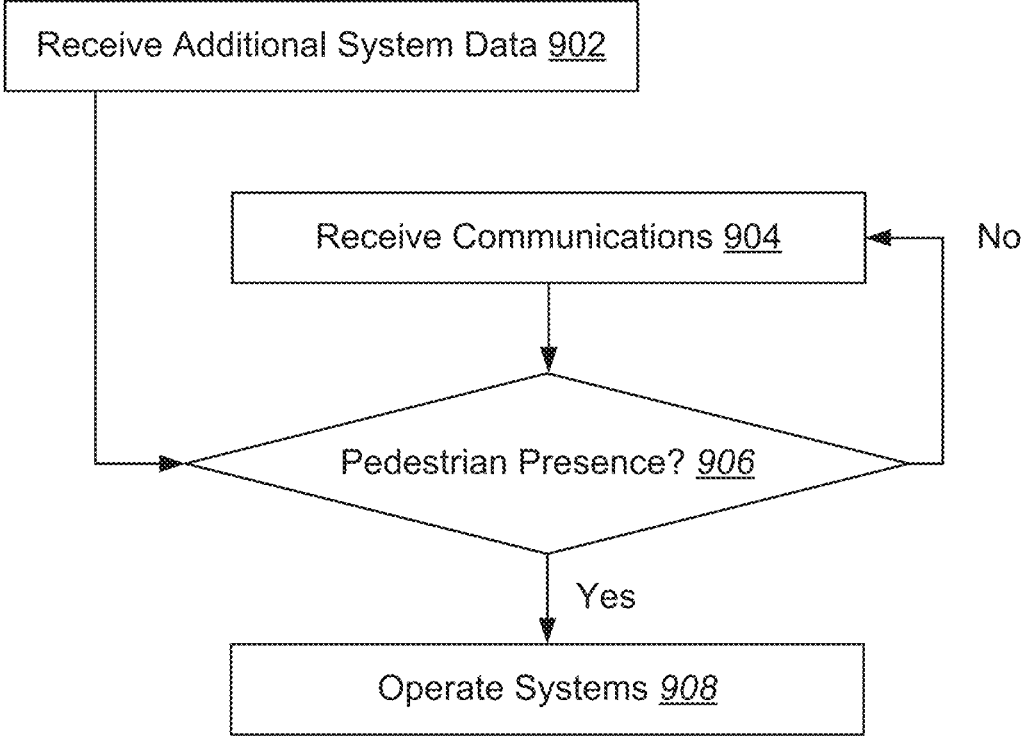
FIG. 9 illustrates a flow process for predictive pedestrian warning, in accordance with one or more embodiments.

FIG. 9 illustrates a flow process for predictive pedestrian warning, in accordance with one or more embodiments. The technique of FIG. 9 may be utilized by vehicles to determine when a pedestrian is nearby and activate systems to improve pedestrian safety. The techniques described herein may be appropriate for vehicles that are quiet in operation, such as electric vehicles, in order to provide notice to pedestrians or other nearby persons that the vehicle is nearby and to be accordingly alert.

In 904, the vehicle may receive communications from an electronic device of a user. The communications may be, for example, wireless data received from the electronic device. The wireless data may be generated by one or more applications of the electronic device and may be configured to communicate with certain vehicles or any vehicles within a threshold distance (e.g., to the limit of the range of the communications technique). Such data may be provided via, for example, WiFi, Bluetooth, and/or another such communications medium. The vehicle may according determine the presence of the pedestrian via receipt of such data.

Furthermore, in 902, additional system data may be received. Such additional system data may include, for example, data received from on-board systems of the vehicle. For example, radar, lidar, cameras, a communications module (e.g., via a communications link with an electronic device), and/or other vehicle sensors may generate data indicating whether there are persons or objects nearby the vehicle. The controller of the vehicle may then determine the presence of such persons or objects. In certain embodiments, based on the determination, the vehicle may then provide wireless data for receipt by the electronic device and the electronic device may accordingly reply (e.g., with data received in 904). In other embodiments, the electronic device may provide data of 904 without receiving any data from the vehicle.

In 906, pedestrian presence around the vehicle may be determined from data received in 902 and/or 904. Thus, for example, communications received in 904 from the electronic device may be determined to indicate that the electronic device of a pedestrian and, thus, the pedestrian itself, is nearby the vehicle. The electronic device may generate signals indicating the presence of the electronic device and such signals may be received by the vehicle. The vehicle may then determine, based on receipt of the signals, that the pedestrian is nearby.

Furthermore, the system data generated in 902 may allow for the vehicle to determine, via, for example, radar, lidar, camera systems, and/or other systems, that a pedestrian and/or other objects are nearby the vehicle. Accordingly, for example, radar and/or lidar may determine the presence of an object nearby the intended travel path of the vehicle.

The vehicle may determine the presence of pedestrians and/or objects nearby the vehicle based on one or more of the data received in 902 and/or 904. For example, the vehicle may determine the presence of pedestrian and/or objects nearby based solely on the data received in 904, based solely on the data received in 902, and/or based on a combination of the data received in 902 and/or 904.

In 908, based on the determination of the presence of pedestrian and/or objects nearby, one or more systems, such as one or more vehicle output modules, may be operated. Thus, for example, a vehicle output module that operates one or more speakers to allow pedestrians to hear the incoming vehicle may be operated. One or more lights may be operated to increase visibility to pedestrians. Other systems may, additionally or alternatively, be operated to provide warning to pedestrians that the vehicle is nearby.

Additionally or alternatively, the vehicle and the electronic device may communicate location data to a server. The server may determine that an electronic device of a pedestrian is nearby the vehicle and may then provide data to the vehicle to operate one or more systems, such as one or more vehicle output modules.

Figure 10:
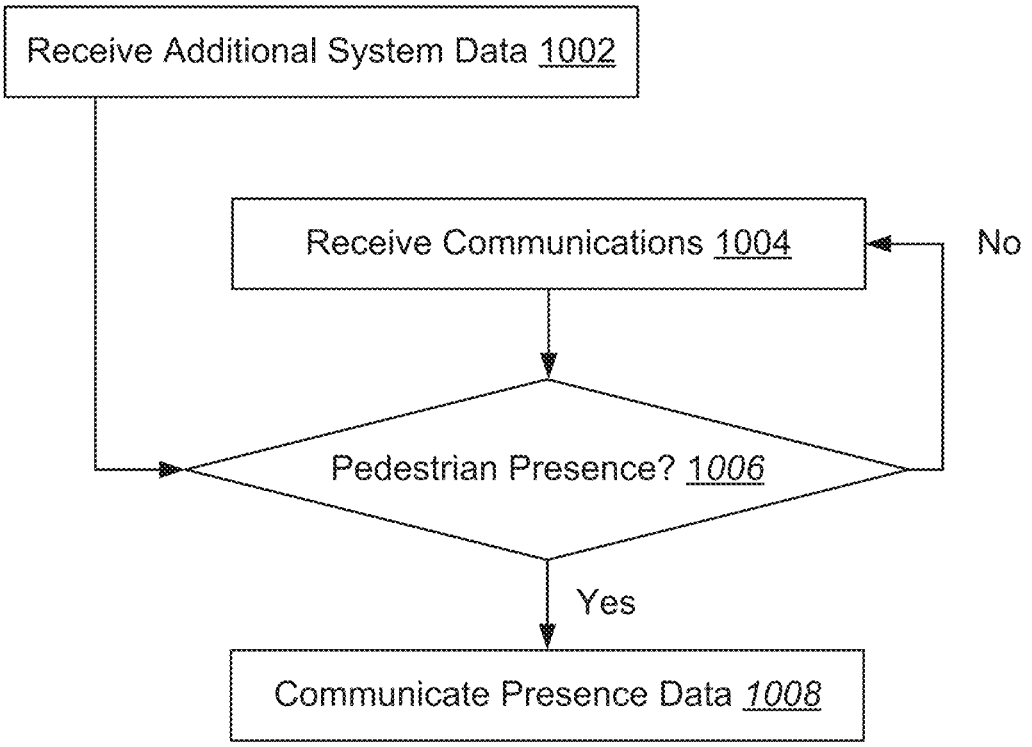
FIG. 10 illustrates a further flow process for predictive pedestrian warning, in accordance with one or more embodiments.

FIG. 10 illustrates a further flow process for predictive pedestrian warning, in accordance with one or more embodiments. FIG. 10 illustrates a technique where the vehicle communicates data to the electronic devices of nearby pedestrians, to provide warning that the vehicle is nearby, increasing pedestrian safety.

1002, 1004, and 1006 are similar to 902, 904, and 906 of FIG. 9. In certain embodiments, in 1006, the location and/or identity of the nearby electronic device may be determined. The vehicle may, thus, receive one or more signals such as Bluetooth signals, location data, and/or other signals from electronic devices nearby. The vehicle may then accordingly provide return signals to the electronic devices nearby, in 1008. Such return signals may include, for example, WiFi, Bluetooth, and/or other communications signals or short-range communications signals.

In 1008, presence data, indicating the presence of the vehicle nearby the electronic device, may be provided to the electronic device. Based on receiving the presence data, the electronic device may then provide an output to the user to indicate to the user that the vehicle is nearby. In certain embodiments, such outputs may include, for example, a vibration of the electronic device, a message communicated through a user interface (e.g., speaker or screen) of the electronic device, and/or another such output that may warn the user of the presence of the vehicle.

Additionally or alternatively, the vehicle may communicate data to a server. The data may include the location of the vehicle. The electronic devices may also communicate location data to the server and the server, upon a determination that an electronic device of a pedestrian is nearby the vehicle. The electronic device may then provide data to the electronic device indicating that a vehicle is nearby. Such data may be presence data that causes the electronic device to output a warning indicating the presence of the vehicle to the user.

Any of the techniques described herein may be utilized in operator piloted vehicles and/or automated vehicles. Though the disclosure may reference piloted or automated vehicles for certain techniques, it is appreciated that all of the techniques described herein may apply to one or both of piloted and automated vehicles, regardless of the examples used in the disclosure. The various portions of the techniques described herein may be performed by one or more controllers of the vehicle and/or by other controllers and other components.

While various specific implementations have been particularly shown and described, it will be understood by those skilled in the art that changes in the form and details of the disclosed implementations may be made without departing from the spirit or scope of this disclosure. In addition, although various advantages, aspects, and objects have been discussed herein with reference to various implementations, it will be understood that the scope of this disclosure should not be limited by reference to such advantages, aspects, and objects.

What is claimed is:

1. A delivery truck comprising:
a body;
an interior disposed within the body and comprising a user interface;
a wheel assembly;
a speed sensor, configured to sense a rotational speed of the wheel assembly and provide speed sensor data based on the rotational speed;
a tire pressure sensor, configured to sense a tire pressure of the wheel assembly and provide tire pressure data;
a first sensor, configured to determine that a road surface is wet and provide weather data;
a multi-mode external camera, configured to selectively operate within one of at least a visual mode and an infrared mode;
a temperature sensor, configured to provide temperature data; and
a controller, communicatively coupled to the speed sensor, the first sensor, the tire pressure sensor, the multi-mode external camera, the temperature sensor, and the interior, wherein the controller is configured to:
receive the weather data;
determine that the delivery truck is traveling on a wet surface from the weather data;
receive the speed sensor data;
determine a ground speed of the delivery truck from the speed sensor data;
receive the tire pressure data;
determine the tire pressure of the wheel assembly from the tire pressure data;
determine a hydroplaning speed based on the tire pressure of the wheel assembly determined from the tire pressure data;
determine that the ground speed is greater than the hydroplaning speed;
output, based on the determining that the ground speed is greater than the hydroplaning speed, a hydroplane warning with the user interface;
receive the temperature data;
determine, based on the temperature data, that an outside temperature indicates an increased risk of possible ice;
set, based on the determining the increased risk of possible ice, the multi-mode camera to the infrared mode; and

determine planned routes and maintenance condition of the delivery truck.

2. The delivery truck of claim 1, wherein the hydroplaning speed, in miles per hour, is determined by multiplying a square root of the tire pressure, in pounds per square inch, by a first factor.

3. The delivery truck of claim 2, wherein the first factor is a pre-determined factor.

4. The delivery truck of claim 2, wherein the first factor has a value of nine.

5. The delivery truck of claim 1, wherein the delivery truck is an autonomous delivery truck and the controller is further configured to:
reduce, based on the determining that the ground speed is greater than the hydroplaning speed, the ground speed of the delivery truck.

6. The delivery truck of claim 1, wherein the delivery truck further comprises:
a global positioning system (GPS) sensor configured to output GPS data, wherein the controller is further configured to:
receive the GPS data;
determine, based on the GPS data, a GPS speed of the delivery truck;
compare the GPS speed to the ground speed;
determine, based on the comparing the GPS speed to the ground speed, a wear amount of a tire of the wheel assembly;
determine that the wear amount is greater than a threshold amount; and
output, based on the determining that the wear amount is greater than the threshold amount, a tire wear warning with the user interface.

7. The delivery truck of claim 6, wherein the determining that the wear amount is greater than the threshold amount comprises determining that the GPS speed is higher than the ground speed by a threshold amount.

8. The delivery truck of claim 6, wherein the hydroplaning speed is adjusted based on the wear amount.

9. The delivery truck of claim 6, wherein the ground speed is determined based further on the tire pressure data.

10. The delivery truck of claim 1, wherein the delivery truck further comprises:
a communications module configured to receive communications data from a third party.

11. The delivery truck of claim 10, wherein the determining that the delivery truck is traveling on the wet surface is further based on the communications data.

12. The delivery truck of claim 10, wherein the controller is further configured to:
provide, via the communications module, planned routes and maintenance condition of the delivery truck to a server system such that data associated with the planned routes and maintenance condition of the delivery truck are accessible by an application.

13. The delivery truck of claim 12, wherein the application is configured to communicate with the controller through wireless data.

14. A non-transitory machine readable medium, the non-transitory machine readable medium configured to cause a delivery truck controller to perform operations comprising:
receiving weather data from a first sensor;
determining that a delivery truck is traveling on a wet surface from the weather data;
receiving speed sensor data from a speed sensor of the delivery truck;

determining a ground speed of the delivery truck from the speed sensor data;

receiving tire pressure data tire pressure sensor of a wheel assembly of the delivery truck;

determining the tire pressure of the wheel assembly from the tire pressure data;

determining a hydroplaning speed based on the tire pressure of the wheel assembly determined from the tire pressure data;

determining that the ground speed is greater than the hydroplaning speed;

outputting, based on the determining that the ground speed is greater than the hydroplaning speed, a hydroplane warning with a user interface of the delivery truck;

receiving temperature data from a temperature sensor;

determining, based on the temperature data, that an outside temperature indicates an increased risk of possible ice;

set, based on the determining the increased risk of possible ice, a multi-mode camera, configured to selectively operate within one of at least a visual mode and an infrared mode, to the infrared mode; and providing planned routes and maintenance condition of the delivery truck.

15. The non-transitory machine readable medium of claim 14, wherein the delivery truck is an autonomous delivery truck.

16. The non-transitory machine readable medium of claim 14, wherein the hydroplaning speed, in miles per hour, is determined by multiplying a square root of the tire pressure, in pounds per square inch, by a first factor.

17. The non-transitory machine readable medium of claim 16, wherein the first factor is a pre-determined factor.

18. The non-transitory machine readable medium of claim 16, wherein the first factor has a value of nine.

19. The non-transitory machine readable medium of claim 18, the non-transitory machine readable medium further configured to cause the delivery truck controller to perform operations comprising:

determining that a wear amount is greater than the threshold amount by determining that a GPS speed of the delivery truck is higher than the ground speed by a threshold amount.

20. The non-transitory machine readable medium of claim 14, wherein the determining that the delivery truck is traveling on the wet surface is further based on the communications data.

\* \* \* \* \*